United States Patent
Fielding

[11] Patent Number: 5,416,865
[45] Date of Patent: May 16, 1995

[54] OPTICAL WAVEGUIDE GAIN-SHAPED AMPLIFIER INCLUDING WAVELENGTH MULTIPLEXING COUPLER

[75] Inventor: Alan Fielding, Herts, United Kingdom

[73] Assignee: Northern Telecom Limited, Quebec, Canada

[21] Appl. No.: 275,493

[22] Filed: Jul. 15, 1994

[30] Foreign Application Priority Data

Jul. 28, 1993 [GB] United Kingdom ............... 9315596

[51] Int. Cl.$^6$ ............... G02B 6/26; H01S 3/30
[52] U.S. Cl. .................. 385/32; 385/15; 385/31; 385/27; 385/42; 385/141; 385/142; 372/6; 359/341; 359/127; 359/134
[58] Field of Search .................. 385/15, 24, 27, 28, 385/30, 31, 32, 42, 43, 46, 141, 142; 372/6, 70, 94; 359/341, 333, 345, 349, 124, 127, 134

[56] References Cited

U.S. PATENT DOCUMENTS

| | | | |
|---|---|---|---|
| 4,839,898 | 6/1989 | Payne et al. | 372/6 |
| 4,859,018 | 8/1989 | O'Sullivan et al. | 385/42 X |
| 4,900,119 | 2/1990 | Hill et al. | 385/32 X |
| 5,067,789 | 11/1991 | Hall et al. | 385/27 |
| 5,131,069 | 7/1992 | Hall et al. | 385/142 |
| 5,239,607 | 8/1993 | da Silva et al. | 385/122 |
| 5,243,609 | 9/1993 | Huber | 372/6 X |
| 5,260,823 | 11/1993 | Payne et al. | 359/341 |
| 5,271,024 | 12/1993 | Huber | 372/6 |
| 5,363,234 | 11/1994 | Newhouse et al. | 359/341 |
| 5,375,010 | 12/1994 | Zervas et al. | 359/341 |

FOREIGN PATENT DOCUMENTS

| | | | |
|---|---|---|---|
| 0474426A2 | 3/1992 | United Kingdom | 385/46 X |
| 2253071A | 8/1992 | United Kingdom | 385/46 X |

*Primary Examiner*—Brian Healy
*Attorney, Agent, or Firm*—Lee, Mann, Smith, McWilliams, Sweeney & Ohlson

[57] ABSTRACT

A wavelength multiplexing tapered fused fibre coupler is used to splice a second length of optical amplifier fibre between first and third lengths in such a way that pump power bypasses it. The second length is therefore unpumped and acts as a notch filter smoothing out the spectral gain characteristic of the first and third lengths.

6 Claims, 1 Drawing Sheet

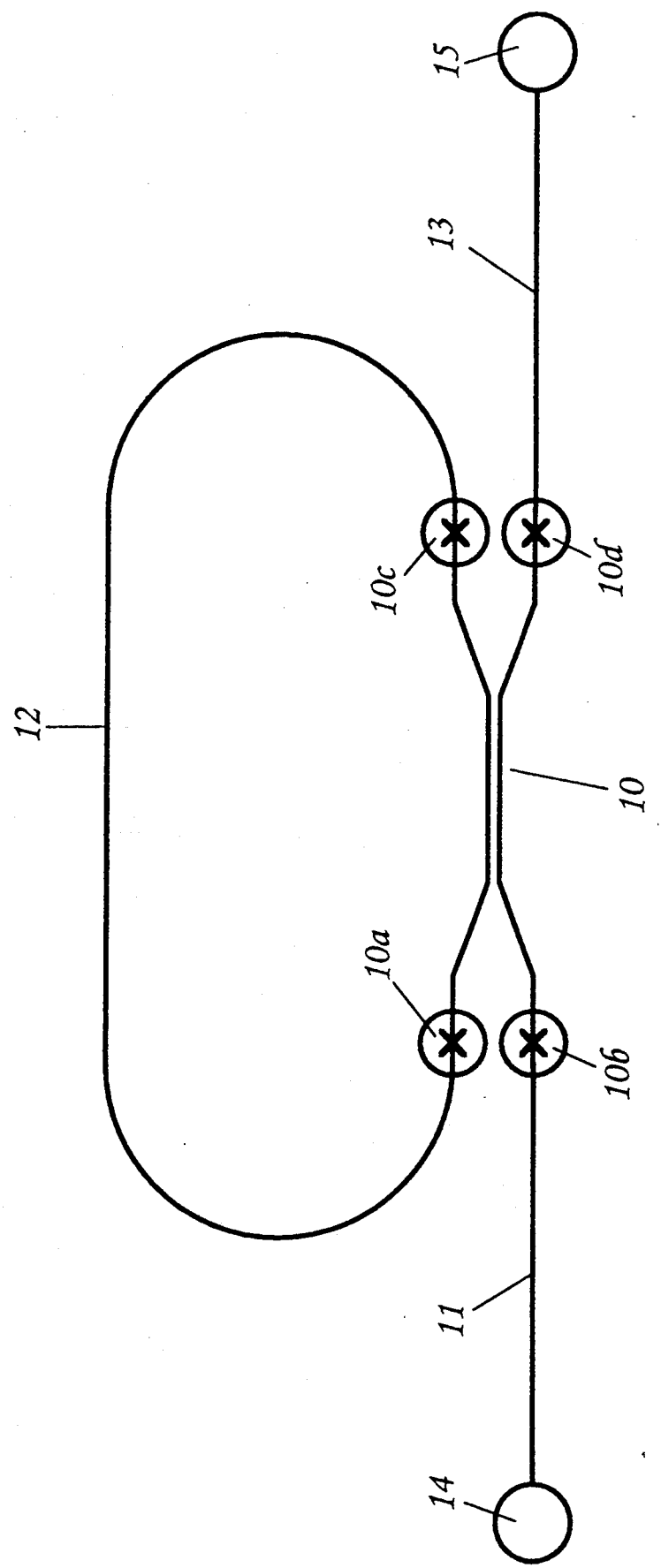

OPTICAL WAVEGUIDE GAIN-SHAPED AMPLIFIER INCLUDING WAVELENGTH MULTIPLEXING COUPLER

BACKGROUND OF THE INVENTION

This invention relates to optical waveguide amplifiers, typically, but not exclusively, erbium doped optical waveguide amplifiers, and particularly to gain-shaped optical waveguide amplifiers. Gain-shaping in an optical waveguide amplifier is employed to provide a more nearly flattened spectral gain characteristic than would otherwise occur, and may be accomplished by the use of a notch filter as for instance described by M. Tachibana et al in a paper entitled 'Erbium-Doped Fiber Amplifier with Flattened Gain Spectrum' IEEE Photonics Technology Letters, Volume No. 2, February 1991 pages 118–120, to which attention is directed. In the absence of smoothing, the gain characteristic of an optical waveguide amplifier is liable to exhibit a relatively sharply defined peak to the long wavelength side of which is a broader plateau of reduced gain. In the case of a typical erbium doped optical fibre amplifier pumped at 980 nm, this peak is at about 1535 nm. A disadvantage of the notch filter described in the above referenced paper is that, because it relies upon the use of a mechanical grating to induce mode coupling between a propagating mode and a radiating mode whose propagation constant differs by only a small amount from that of the propagating mode, it needs to be inconveniently long in order to achieve the requisite selectivity. In the particular example quoted in that paper the mechanical grating extends linearly 390 mm.

SUMMARY OF THE INVENTION

The present invention is directed to an arrangement employing an alternative form of filter. Particularly when implemented in optical fibre format, an advantage of the use of the alternative form is that it does not require as much linear extent because it is in a form that is convenient to wind into a coil.

According to the present invention there is provided a gain-shaped optical waveguide amplifier having a 4-port 2×2 coupler which is wavelength multiplexing at the pump and signal wavelengths of the amplifier, and to whose four ports are coupled first, second and third lengths of optical amplifier waveguide in a configuration such that pump power is directed by the coupler directly between the first and the third length while signal power is directed from the first to the third via the second length of amplifier waveguide.

An amplifier according to the present invention relies upon the fact that unpumped amplifier waveguide exhibits an absorption peak with which the gain peak of pumped amplifier waveguide can be brought into registry. The arrangement of the wavelength multiplexing coupler is such that the signal power is caused to propagate in turn through all three lengths of amplifier waveguide, while pump power is caused to bypass the second length. In this way the first and third sections can readily be pumped, by co-pumping, counter pumping or bi-directional pumping, in a manner that leaves the second section unpumped and thus able to perform a filtering function required for gain-shaping.

BRIEF DESCRIPTION OF THE DRAWINGS

There follows a description of gain-shaped optical fibre amplifier embodying the present invention in a preferred form, The description refers to the accompanying drawing which is a schematic representation of the amplifier.

DETAILED DESCRIPTION OF THE PREFERRED EMBODIMENT

The amplifier schematically depicted in the accompanying drawing has a 2×2 fused tapered fibre coupler 10 to which are connected, by four splices 10a, 10b, 10c, and 10d first, second and third lengths 11, 12 and 13 of optically amplifier fibre, typically erbium-doped optical amplifier fibre. The coupler 10 is wavelength multiplexing at the signal and pump wavelengths of the amplifier. The connections are such that signal power launched into input terminal 14 of the first length 11 of amplifier fibre to reach the coupler 10 by way of splice 10b is directed by the coupler via splice 10c, into the second length 12 of amplifier fibre to loop back for re-entry into the coupler, via splice 10a, so as to re-emerge, via coupler 10d, and so be launched into the third length 13 of amplifier fibre to emerge from the amplifier at port 15. Correspondingly, at the pump power wavelength, any pump power, launched in at terminal 14 for co-pumping, is directed by the coupler 10 straight from the first length 11 of amplifier fibre to the third length 13 so as to bypass the second length 12, while any pump power, launched in at terminal 15 for counter-pumping, is directed by the coupler 10 straight from the third length 13 to the first length 11, similarly to bypass the second length 12.

The coupler 10 is constructed from two fibres, and, for convenience of illustration, the drawing represents that splices 10a and 10c are on the same fibre, but it should be clearly understood that the construction of the coupler may be such that splices 10a and 10d are on the same fibre, in which case the multiplexing operation of the coupler is such as to cause pump power to make the transition from one fibre to the other instead of the signal power.

I claim:

1. A gain-shaped optical waveguide amplifier which employs optical power at a pump wavelength to amplify an optical signal at a signal wavelength, which amplifier includes a 4-port 2×2 coupler which is wavelength multiplexing at the pump and signal wavelengths of the amplifier, and to whose four ports are connected first, second and third lengths of optical amplifier waveguide in a configuration such that pump power is directed by the coupler directly between the first and the third length while signal power is directed from the first to the third via the second length of amplifier waveguide.

2. A gain-shaped optical waveguide amplifier as claimed in claim 1, wherein said lengths of amplifier waveguide are erbium-doped.

3. A gain-shaped optical waveguide amplifier as claimed in claim 2, wherein said first second and third lengths of amplifier waveguide are constructed in optical fibre format.

4. A gain-shaped optical waveguide amplifier as claimed in claim 3 wherein the 4-port 2×2 coupler is constructed in optical fibre format.

5. A gain-shaped optical waveguide amplifier as claimed in claim 1, wherein said first second and third lengths of amplifier waveguide are constructed in optical fibre format.

6. A gain-shaped optical waveguide amplifier as claimed in claim 5 wherein the 4-port 2×2 coupler is constructed in optical fibre format.

* * * * *